June 30, 1942.  F. H. GULLIKSEN ET AL  2,287,993

ELECTRIC DISCHARGE APPARATUS

Filed Sept. 7, 1939  2 Sheets-Sheet 1

WITNESSES:

INVENTORS
Finn H. Gulliksen, Joseph W. Allison
and Cullen T. Pearce.
BY
ATTORNEY

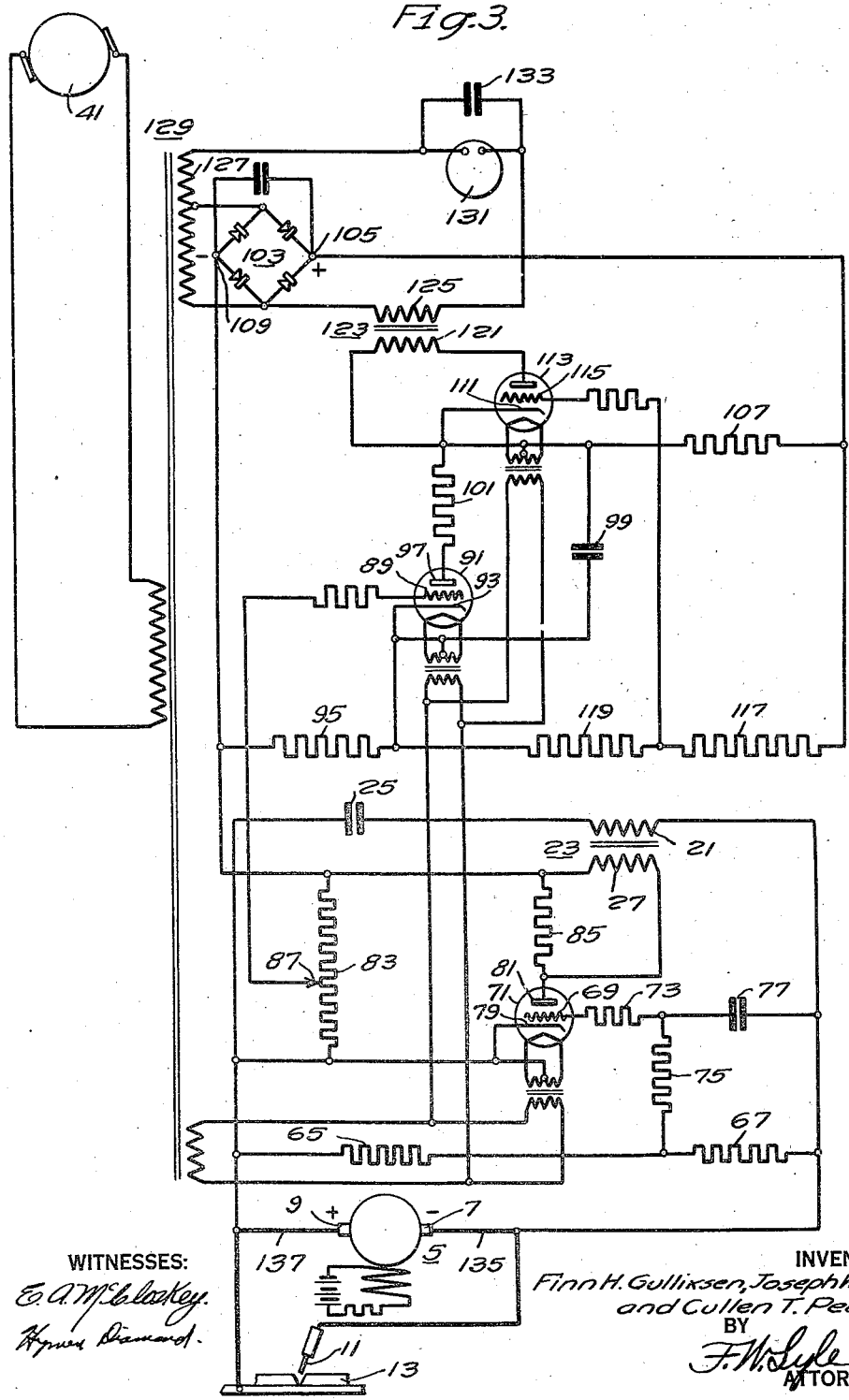

Patented June 30, 1942

2,287,993

UNITED STATES PATENT OFFICE 2,287,993

ELECTRIC DISCHARGE APPARATUS

Finn H. Gulliksen, Pittsburgh, Joseph W. Allison, Swarthmore, and Cullen T. Pearce, Ridley Park, Pa., assignors to Westinghouse Electric & Manufacturing Company, East Pittsburgh, Pa., a corporation of Pennsylvania Application September 7, 1939, Serial No. 293,726

9 Claims. (Cl. 219—8)

Our invention relates to electric discharge apparatus and has particular relation to apparatus for timing the operation of arc-welding equipment.

In arc-welding timing apparatus constructed in accordance with the teachings of the prior art of which we are aware, the variations in current and potential which occur during a welding operation are used for indicating the time interval during which useful work is being performed. Because of the normal fluctuations which are inherent in the usual commercial welding generators, difficulties are encountered in obtaining suitably accurate records. In one situation of which we are aware, the voltage ripple of the generator is as high as 20 percent of the magnitude. On the other hand, the potential of the generator is adjustable from 20 volts to 160 volts, and, therefore, the ripple at the low potentials becomes appreciable. The ripple vitiates the response of the pick-up equipment and difficulty is encountered in distinguishing between an open circuit condition of the generator, the supply of a continuous arc by the generator, the continuous short-circuit condition of the generator, and the performance of useful work.

It is, accordingly, an object of our invention to provide apparatus for accurately indicating the time during which useful work is being performed with arc-welding equipment.

Another object of our invention is to provide apparatus for clearly distinguishing between an open circuit condition of a welding generator, a continuous closed circuit condition of the generator, the supply of a continuous arc by the generator, and the performance of useful welding.

A further object of our invention is to provide a timer for arc-welding equipment, the response of which shall be accurate in spite of the fluctuations inherent in the welding generator.

A general object of our invention is to provide apparatus for indicating the time during which an electrical source that is short-circuited at intervals is in the short-circuited condition.

A more specific object of our invention is to provide a timing arrangement which is to measure the length of predetermined intermittent time intervals.

Another specific object of our invention is to provide a novel timing circuit.

An ancillary object of our invention is to provide an apparatus for indicating the length of time during which a continuous arc is drawn with an arc welder.

More concisely stated, it is an object of our invention to provide simple, inexpensive and precise timing apparatus for arc welding equipment.

The arc-welding timer in accordance with our invention includes a valve which functions in accordance with the terminal voltage of the welding generator and controls the operation of an indicator. Specifically, an electric discharge valve having a control circuit is used. The control potential and its principal potential are derived from the welding source. When the source is open-circuited the valve is biased to a nonconductive condition. When the source is short-circuited continuously for extensive intervals of time the valve is non-conductive because its principal potential is substantially zero. When a continuous arc is being drawn the valve is maintained non-conductive by the bias potential which exists across the arc. When useful welding is being performed the source is short-circuited at irregular short intervals by the molten metal which drops from the welding electrode, and the potential variations thus produced render the valve conductive.

The novel features that we consider characteristic of our invention are set forth with particularity in the appended claims. The invention itself, however, both as to its organization and its method of operation, together with additional objects and advantages thereof will best be understood from the following description of specific embodiments when read in connection with the accompanying drawings, in which:

Fig. 3 is a diagrammatic view showing a modification of our invention.

Figure 1:
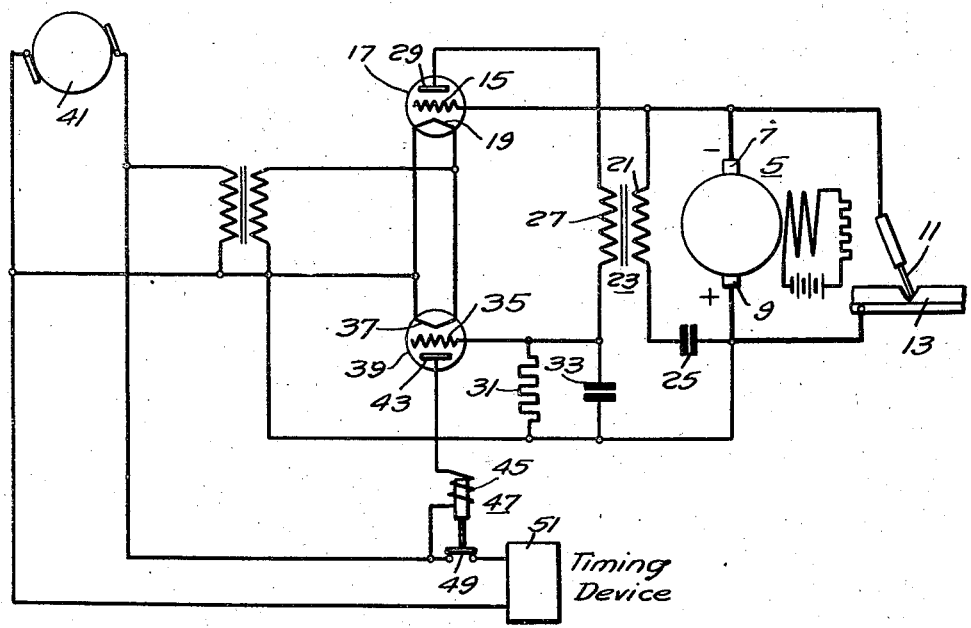
Figure 1 is a diagrammatic view showing an embodiment of our invention.

The apparatus shown in Figure 1 comprises a welding generator 5 to the terminals 7 and 9 of which an arc-welding electrode 11 and the material 13 to be welded, respectively, are connected in the usual manner. Our invention is shown specifically as applied in a system in which the generator 5 is of the direct-current type. In its broadest aspects it may be practiced with a welding system in which the generator is of the alternating-current type.

The negative terminal 7 of the generator 5 is connected to the control electrode 15 of an electric discharge valve 17 and the positive terminal 9 is connected to the cathode 19 of the valve. The valve 17 is, in accordance with the preferred practice of our invention, of the high vacuum type. Of course, arc-like valves or valves of other types may also be used.

Across the terminals 7 and 9 of the generator the primary 21 of a transformer 23 is connected in series with a capacitor 25. The capacitor 25 prevents direct current from the generator 5 from flowing through the primary 21 and saturating the transformer. The secondary 27 of the transformer 23 is connected between the anode 29 and the cathode 19 of the valve 17 through a resistor 31. Across the resistor another capacitor 33 is connected. The resistor 31 is connected between the control electrode 35 and the cathode 37 of a second electric discharge valve 39 which is preferably of the arc-like type but may be of the high-vacuum type. The latter valve 39 is energized from a suitable power source 41, which is preferably of the alternating-current type, and its anode 43 and cathode 37 are connected across the supply through the exciting coil 45 of a suitable relay 47. The contact 49 of the relay opens and closes a circuit through a timer 51 which is supplied from the source 41.

Figure 2:
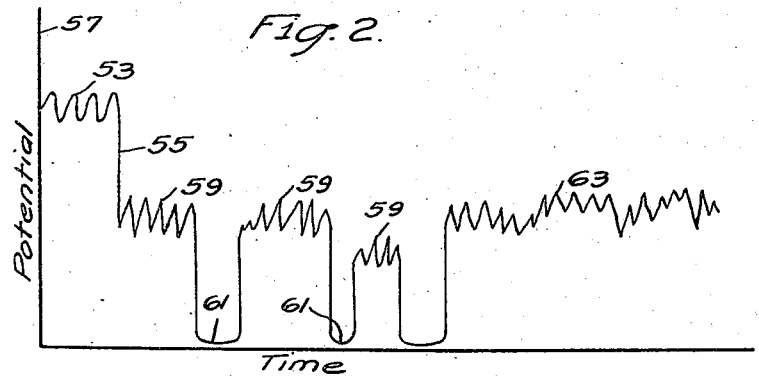
Fig. 2 is a graph illustrating the operation of apparatus in accordance with our invention.

In Fig. 2 the terminal potential of the welding generator 5 during a welding operation is plotted as a function of time. Initially the welding generator is open-circuited and its terminal potential is high as represented by the portion 53 of the curve 55 adjacent to the potential axis 57. Under such circumstances the negative bias impressed by the generator 5 between the control electrode 15 and the cathode 19 of the high-vacuum valve 17 maintains the latter substantially non-conductive. The current flow through the resistor 31 in series with the valve is, therefore, small and the arc-like valve 39 is conductive since its control electrode 35 is substantially at the potential of its cathode 37. The relay 47 is, therefore, energized and the circuit through the timer 51 is open.

As the operator brings the welding electrode 11 up to the material 13, an arc is ignited between the electrode and the material, and the terminal potential is reduced to an intermediate value as represented by the portion 59 of the curve 55 adjacent to that representing the open circuit potential. Under such circumstances the generator potential is still sufficiently high to bias the high-vacuum valve 17 to non-conductivity and the timer 51 is still deenergized. When the electrode metal melts and drops to the material 13 to produce a weld, the generator is abruptly short-circuited, and its potential is substantially reduced as represented by the hollow portion 61 adjacent to the arc potential portion 59 of the curve. The control potential of the high vacuum valve 17 is now reduced so that if anode-cathode potential of sufficient magnitude is impressed, the valve is capable of conducting current. The anode-cathode potential is derived from the secondary 27 of the transformer 23 when it is induced by reason of the abrupt decrease in the generator terminal voltage. The high vacuum valve 17 is, therefore, rendered conductive and current flows through the resistor 31. The potential drop across the resistor is impressed as a blocking potential between the control electrode 35 and the cathode 37 of the arc-like valve 39, and the latter is rendered non-conductive. The relay 47 is then deenergized and the circuit through the timer 51 is closed.

The short-circuit produced by the flow of metal persists for only a short interval of time as indicated in Fig. 2 and thereafter an arc is reestablished. The arc is followed by another short circuit and this, in turn, is followed by another arc. The operation of the apparatus continues in this manner until the welding is discontinued. As the arcs are reestablished after each short circuit, the bias potential supplied by the welding generator renders the high-vacuum valve 17 non-conductive. The capacitor 33 in parallel with the resistor 31 serves to suppress the effect of the short irregular fluctuations in the generator potential and, therefore, the timer 51 does not follow the high vacuum valve 17 but operates continuously so long as useful work is being performed.

The capacitor 33 is charged by the current flow through the high vacuum valve 17 and when the valve becomes non-conductive for an instant, the capacitor is discharged through the resistor 31 and maintains the gaseous valve conductive. The timer 51 thus continues to operate in spite of the discontinuance of the flow of current through the high-vacuum valve. The capacitor 33 and the resistor 31 are so dimensioned that the timing continues for an interval of the order of a half second to a second after the flow of current through the high-vacuum valve is interrupted. If, however, an arc is drawn between the electrode 11 and the work 13 for an interval of time longer than that permitted by the setting of the capacitor-resistor network, as is represented by the right-hand portion 63 of the curve 55 in Fig. 2, the arc-like valve 39 again becomes conductive and the timing is interrupted.

In the apparatus shown in Fig. 3 a pair of resistors 65 and 67 are connected across the generator 5 in parallel with the capacitor 25 and the primary 21 of the transformer 23. The control electrode 69 of an electric discharge valve 71 which may be of the high vacuum type is connected to the junction point of the two resistors 65 and 67 through a grid resistor 73 and still another resistor 75. A second capacitor 77 interconnects the negative terminal 7 of the generator 5 and the junction of the third resistor 75 and the grid resistor 73. The cathode 79 of the valve 71 is connected to the positive terminal 9 of the generator 5. The anode 81 and the cathode 79 are interconnected through the secondary 27 of the transformer and a voltage divider 83. For stabilization purposes a resistor 85 is connected across the secondary 27.

The adjustable tap 87 of the voltage divider 83 is connected to the control electrode 89 of an electric discharge valve 91 of the arc-like type. The cathode 93 of the latter valve 91 is connected to the upper terminal of the voltage divider 83 through a resistor 95. Between the anode 97 and the cathode 93 of the valve a capacitor 99 is connected through a current limiting resistor 101. The capacitor 99 is maintained charged from a rectifier 103 which is, in turn, supplied from the alternating-current source 41. The charging circuit for the capacitor extends from the positive terminal 105 of the rectifier through a resistor 107, the capacitor 99, the resistor 95 to the negative terminal 109 of the rectifier.

The plate of the capacitor 99 which is charged positive is connected to the cathode 111 of another electric discharge valve 113 of the arc-like type. The control electrode 115 of the valve is connected to the junction point of two resistors 117 and 119 which are connected in parallel with the capacitor 99 and the resistor 107 through which it is charged. The last-mentioned valve 113 is supplied with anode-cathode potential from the secondary 121 of a transformer 123. The primary 125 of the transformer is connected to a secondary section 127 of a transformer 129, energized from the source 41 through a timer 131. The latter is customarily a synchronous chronometer with an inductive winding (not shown). In parallel with the timer 131 a capacitor 133 is connected. The capacitor 133 and the reactance of the timer are tuned to the frequency of the alternating-current source 41.

When the generator 5 is in open-circuit condition or is supplying a continuous arc, the high-vacuum valve 71 is maintained substantially non-conductive by the blocking potential impressed by the left-hand resistor 65 of the pair parallel to the generator. The capacitor 77 in the control circuit of the valve is at this time fully charged but it has no effect on its conductivity. The arc-like valve 91 is maintained non-conductive by the bias potential impressed through the resistor 95, which is supplied with current from the rectifier. The other arc-like valve 113 is also maintained non-conductive by the bias potential impressed from the resistor 119 and the capacitor 99.

When the generator 5 is momentarily short-circuited during a welding operation, the potential across the left-hand resistor 65 is substantially reduced and a high anode-cathode potential is impressed on the valve 71. In view of the fact that the current flow from the generator 5 during an instantaneous short-circuit is large, the potential drop in the leads 135 and 137 from the generator may be large and a substantial negative potential may still be impressed in the control circuit of the high-vacuum valve from the resistor 65. However, the latter potential is counteracted by the potential drop across the resistor 75 in series with the control electrode 69 which is produced by the discharge of the capacitor 77 in the control circuit. The high-vacuum valve, therefore, conducts substantial current through the voltage divider 83, rendering the adjustable tap 87 of the voltage divider substantially positive with reference to the upper terminal. The bias impressed in the control circuit of the first-mentioned arc-like valve 91 is, therefore, counteracted and the valve is rendered conductive, discharging the capacitor 99 in parallel therewith.

The impedance in circuit with the capacitor 99 is small and it is discharged instantaneously. A portion of the biasing potential in the control circuit of the second arc-like valve 113 is thus absorbed and the valve is rendered conductive. The open circuit which existed across the transformer 123 in series with the timer 131 is closed and the timer carries substantial current. Because of the inductance which exists in the conductors associated with the first valve 91, the capacitor 99 recharges slightly to the opposite polarity when it is discharged and the valve 91 is extinguished soon after the capacitor is discharged. The capacitor 99 is now recharged but the second arc-like valve 133 continues to conduct current during alternate half-cycles of the source 41 until the recharging potential attains predetermined magnitude. The time interval involved here is dependent on the magnitudes of the charging resistors 107 and 95 and is of the order of one-half second to a second. As the welding progresses the timer thus continues to record the time spent in useful welding regardless of the irregularities in the individual welding operations. The tuning capacitor 133 in parallel with the timer 131 facilitates its operation since it tends to smooth out the irregular wave form which is produced by the short-circuiting of the secondary 121 of the series transformer 123 during alternate half periods of the source.

Where my invention is used with an alternating current welding generator certain changes are made in the circuit arrangement. In such a case the potential impressed on the high-vacuum valve 39 or 71 from the generator must be polarized so as to produce the proper conductivity. This object may be accomplished by interposing suitable rectifiers between the control circuit of the valve and the generator.

When a continuous arc is drawn for any substantial length of time with a welder the work is badly pitted. It is therefore desirable that the people in charge of a welding plant be informed when this condition exists. During working hours in a welding shop the generators are rarely short-circuited or open circuited and, therefore, the failure of the timer to indicate useful work is an indication of excessive continuous arcing. To enable the shop foreman to suppress continuous arcing as far as possible a light or sound signal may be connected in parallel with the timer in such manner that it operates when the timer does not. When the foreman sees a continuous signal he can go to the bench to which it corresponds and determine what the difficulty is. The signal also informs the operator that he is welding improperly. A switch may be provided in series with both the timer and the signal so that an operator who desires to leave the work for a short time can prevent the signal from being actuated.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. For use in actuating a timer that times the operation of an arc-welder supplied from a potential source, the combination comprising electric discharge valve means having control circuit means and principal circuit means interposed between said source and said timer and means for impressing the terminal potential of said source on said control circuit means and on said principal circuit means.

2. For use in actuating a timer that times the operation of an arc-welder supplied from a potential source, the combination comprising electric discharge valve means having a control circuit means and principal circuit means interposed between said source and said timer, means for impressing a voltage proportional to the terminal potential of said arc-welder in said control circuit means and means comprising a transformer, the primary of which is energized from the voltage-drop across said arc-welder and the secondary of which energizes said principal circuit means for actuating said timer.

3. For use in actuating a timer that times the operation of an arc-welder supplied from a potential source, the combination comprising electric discharge valve means having a control circuit means and principal circuit means interposed between said source and said timer, means for impressing a voltage proportional to the terminal potential of said arc-welder in said control circuit means and means comprising a transformer, the primary of which is connected in shunt-circuit relation with said source and the secondary of which is connected in series-circuit relation with said principal circuit means to control operating-energy flow to said timer and a capacitor interposed between said primary and said source.

4. For use with a potential source that is short-circuited at intervals the combination comprising an electric discharge valve having a plurality of principal electrodes and a control electrode, means for connecting said source between said control electrode and one of said principal electrodes in such a sense that when it is not short-circuited its terminal potential biases said valve to non-conductivity, and means for impressing a potential derived from said source as a result of short-circuit between said principal electrodes.

5. For use with a potential source that is short-circuited at intervals the combination comprising an electric discharge valve having a plurality of principal electrodes and a control electrode, means for connecting said source between said control electrode and one of said principal electrodes, a transformer, means for connecting the primary of said transformer across said source and means for connecting the secondary of said transformer in circuit with said principal electrodes.

6. For use with a potential source that is short-circuited at intervals the combination comprising an electric discharge valve having a plurality of principal electrodes and a control electrode, means for connecting said source between said control electrode and one of said principal electrodes in such manner that said source applies a blocking potential on said valve, a transformer, means for connecting the primary of said transformer across said source and means for connecting the secondary of said transformer in circuit with said principal electrodes.

7. For use with a potential source that is short-circuited at intervals the combination comprising an electric discharge valve having a plurality of principal electrodes and a control electrode, means for connecting said source between said control electrode and one of said principal electrodes, a transformer, means including direct-current blocking means for connecting the primary of said transformer across said source and means for connecting the secondary of said transformer in circuit with said principal electrodes.

8. For use with a direct-current potential source that is short-circuited at intervals the combination comprising an electric discharge valve having a plurality of principal electrodes and a control electrode, means for connecting said source between said control electrode and one of said principal electrodes, with its negative terminal connected to said control electrode and its positive terminal to said one principal electrode, a transformer, means for connecting the primary of said transformer across said source and means for connecting the secondary of said transformer in circuit with said principal electrodes.

9. For use with a source that is substantially short-circuited at intervals the combination comprising an electric discharge valve having a control electrode and a plurality of principal electrodes, means for connecting the terminals of said source between said control electrode and one of said principal electrodes, charge storing means connected between said control electrode and one of the terminals of said source and means for discharging said storing means when said source is short-circuited in such a sense that the potential resulting from the discharge varies the potential between said control electrode and one principal electrode in the same sense as it is varied by said short circuit.

FINN H. GULLIKSEN.
JOSEPH W. ALLISON.
CULLEN T. PEARCE.